United States Patent
Lan et al.

(10) Patent No.: US 12,132,226 B2
(45) Date of Patent: Oct. 29, 2024

(54) SEPARATOR, SECONDARY BATTERY CONTAINING SUCH SEPARATOR, AND RELATED BATTERY MODULE, BATTERY PACK, AND APPARATUS

(71) Applicant: CONTEMPORARY AMPEREX TECHNOLOGY (HONG KONG) LIMITED, Hong Kong (CN)

(72) Inventors: Yuanyuan Lan, Ningde (CN); Jianrui Yang, Ningde (CN); Haiyi Hong, Ningde (CN); Cong Cheng, Ningde (CN); Na Liu, Ningde (CN); Haizu Jin, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/114,164

(22) Filed: Feb. 24, 2023

(65) Prior Publication Data
US 2023/0207963 A1    Jun. 29, 2023

Related U.S. Application Data

(63) Continuation of application No. PCT/CN2020/132953, filed on Nov. 30, 2020.

(51) Int. Cl.
*H01M 50/446* (2021.01)
*H01M 50/417* (2021.01)
(Continued)

(52) U.S. Cl.
CPC ....... *H01M 50/446* (2021.01); *H01M 50/417* (2021.01); *H01M 50/426* (2021.01); *H01M 50/449* (2021.01); *H01M 50/494* (2021.01)

(58) Field of Classification Search
None
See application file for complete search history.

(56) References Cited

U.S. PATENT DOCUMENTS

| 11,814,483 B2 | 11/2023 | Jeon et al. |
| 2015/0188108 A1 | 7/2015 | Miyazawa et al. |

(Continued)

FOREIGN PATENT DOCUMENTS

| CN | 105958000 A | 9/2016 |
| CN | 109148798 A | 1/2019 |

(Continued)

OTHER PUBLICATIONS

Machine translation of Ka et al. (KR 20170025159 A).*

(Continued)

*Primary Examiner* — Haixia Zhang
(74) *Attorney, Agent, or Firm* — Kilpatrick Townsend & Stockton LLP

(57) ABSTRACT

This application relates to a separator, including a substrate and a coating layer provided on at least one surface of the substrate. The coating layer includes organic particles and inorganic particles, the organic particles include first-type organic particles, the inorganic particles form an inorganic particle layer, and the first-type organic particles are embedded into the inorganic particle layer and form bulges on a surface of the inorganic particle layer. A number-based median particle size of the first-type organic particles is ≥12 μm, and a ratio of an average height of the bulges to a thickness of the inorganic particle layer is ≥4. This application further relates to a separator preparation method, a secondary battery containing such separator, and a related battery module, battery pack, and apparatus.

17 Claims, 11 Drawing Sheets

(51) Int. Cl.
    *H01M 50/426*  (2021.01)
    *H01M 50/449*  (2021.01)
    *H01M 50/494*  (2021.01)

(56) References Cited

U.S. PATENT DOCUMENTS

| | | |
|---|---|---|
| 2019/0280274 A1 | 9/2019 | Kim et al. |
| 2021/0005858 A1* | 1/2021 | Kim .................... H01M 50/457 |
| 2021/0184311 A1* | 6/2021 | Lefebvre ............. H01M 50/489 |
| 2022/0285722 A1 | 9/2022 | Sung et al. |

FOREIGN PATENT DOCUMENTS

| | | |
|---|---|---|
| CN | 109950451 A | 6/2019 |
| CN | 111554860 A | 8/2020 |
| CN | 111599971 A | 8/2020 |
| CN | 111653717 A | 9/2020 |
| CN | 111682149 A | 9/2020 |
| CN | 111725511 A | 9/2020 |
| CN | 111954943 A | 11/2020 |
| CN | 113363672 A | 9/2021 |
| CN | 117397109 A | 1/2024 |
| EP | 2485295 A1 | 8/2012 |
| EP | 3503255 A1 | 6/2019 |
| KR | 1020120091028 A | 8/2012 |
| KR | 1020150020667 A | 2/2015 |
| KR | 20160118979 A | 10/2016 |
| KR | 20170025159 A | 3/2017 |
| KR | 101838337 B | 3/2018 |
| KR | 1020190102572 A | 9/2019 |
| KR | 1020200045790 A | 5/2020 |
| KR | 1020200081442 A | 7/2020 |
| KR | 102181313 B1 | 11/2020 |
| KR | 102582604 B | 9/2023 |
| WO | 2019089492 A1 | 5/2019 |

OTHER PUBLICATIONS

International Search Report and Written Opinion, PCT/CN2020/132953, dated Aug. 30, 2021, 9 pgs.
Cancellation of utility model registration received in the corresponding Korean Patent No. 2582604, mailed Feb. 26, 2024.
Cancellation of utility model registration received in the corresponding Korean Patent No. 2537203, mailed Nov. 23, 2023.
Third Party Submission received in the corresponding European Application 20963115.9, mailed Feb. 16, 2024.
Cancellation of utility model registration received in the corresponding Korean Patent No. 2536847, mailed Nov. 23, 2023.
Third Party Submission received in the corresponding European Application 20963111.8, mailed Feb. 8, 2024.
First Office Action received in the counterpart Chinese Application No. 202080103004.6, mailed on Jun. 4, 2024.

* cited by examiner

SEPARATOR, SECONDARY BATTERY CONTAINING SUCH SEPARATOR, AND RELATED BATTERY MODULE, BATTERY PACK, AND APPARATUS

CROSS-REFERENCE TO RELATED APPLICATION

This application is a continuation application of PCT Patent Application No. PCT/CN2020/132953, entitled "ISOLATION MEMBRANE, SECONDARY BATTERY COMPRISING SAME, AND RELATED BATTERY MODULE BATTERY PACK AND DEVICE" filed on Nov. 30, 2020, which is incorporated herein by reference in its entirety.

TECHNICAL FIELD

This application relates to the field of secondary batteries, and in particular, to a separator, a secondary battery containing such separator, and a related battery module, battery pack, and apparatus.

BACKGROUND

In recent years, secondary batteries have developed quickly due to their advantages such as light weight and zero memory effect, and are widely used in various consumer electronic products and electric vehicles. With the rapid development of the battery industry, higher requirements are posed on performance of the secondary batteries. Although those skilled in the art have carried out a lot of research, safety performance and electrochemical performance of the secondary batteries are still key challenges in the battery field.

In view of this, it is necessary to provide a secondary battery, which has better safety performance and electrochemical performance and can better address market needs.

SUMMARY

In view of the problem mentioned in the Background, this application provides a separator, so that a secondary battery containing the separator can provide better cycling performance and safety performance.

To achieve the foregoing objective, a first aspect of this application provides a separator, which includes a substrate and a coating layer provided on at least one surface of the substrate. The coating layer includes organic particles and inorganic particles. The organic particles include first-type organic particles, the inorganic particles form an inorganic particle layer, and the first-type organic particles are embedded into the inorganic particle layer and form bulges on a surface of the inorganic particle layer. A number-based median particle size of the first-type organic particles is ≥12 µm. A ratio of an average height of the bulges to a thickness of the inorganic particle layer is ≥4.

Compared with the prior art, this application has at least the following beneficial effects:

For the separator in this application, the inorganic particles and the first-type organic particles are included in the same coating layer, and an overall thickness of the separator is greatly reduced compared with a separator having two coating layers, namely an inorganic particle layer and an organic particle layer, thereby improving energy density of a battery. The organic particles and the inorganic particles form a special coating layer structure, which can ensure superior adhesion and contact between the separator and electrode plates, thereby improving the cycling performance of the battery. In addition, during operation at high temperatures, the coating layer structure of the separator can form a glue film structure, which can effectively reduce ion transmission channels and delay heat transfer, thereby further improving the safety performance of the battery.

In any embodiment of this application, the ratio of the average height of the bulges to the thickness of the inorganic particle layer is 4-20, in some embodiments, 5-15. When the ratio of the average height of the bulges to the thickness of the inorganic particle layer is within the foregoing range, the cycling performance and safety performance of the battery can be further improved.

In any embodiment of this application, the average height of the bulges is ≥10 µm, in some embodiments, 12 µm-18 µm. When the average height of the bulges is within the foregoing range, the cycling performance and safety performance of the battery can be further improved.

In any embodiment of this application, the number-based median particle size of the first-type organic particles is 15 µm-25 µm. When the number-based median particle size of the first-type organic particles is within the foregoing range, the cycling performance and safety performance of the battery can be further improved.

In any embodiment of this application, the first-type organic particles are secondary particles. When the first-type organic particles are secondary particles, the cycling performance and safety performance of the battery can be further improved.

In any embodiment of this application, the first-type organic particles include one or more of a homopolymer or copolymer of a fluorinated alkenyl monomer unit, a homopolymer or copolymer of an alkylene monomer unit, a homopolymer or copolymer of an unsaturated nitrile monomer unit, a homopolymer or copolymer of an alkylene oxide monomer unit, and modified compounds of the foregoing homopolymers or copolymers.

In some embodiments, the first-type organic particles include one or more of polytetrafluoroethylene, polytrifluorochloroethylene, polyfluoroethylene, polyvinylidene fluoride, polyethylene, polypropylene, polyacrylonitrile, polyethylene oxide, a copolymer of different fluorinated alkenyl monomer units, a copolymer of the fluorinated alkenyl monomer unit and the alkylene monomer unit, a copolymer of the fluorinated alkenyl monomer unit and an acrylic acid monomer unit, a copolymer of the fluorinated alkenyl monomer unit and an acrylic monomer unit, and modified compounds of the foregoing homopolymers or copolymers.

In any embodiment of this application, the first-type organic particles include one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of the foregoing copolymers.

In any embodiment of this application, the separator satisfies at least one of the following (1) and (2):
(1) a mass ratio of the first-type organic particles to the coating layer is ≥12%, in some embodiments, 15%-25%; and
(2) a mass ratio of the inorganic particles to the coating layer is ≥85%, in some embodiments, 60%-75%.

When the mass ratio of the first-type organic particles or inorganic particles is within the foregoing range, the cycling performance and safety performance of the battery can be further improved.

In any embodiment of this application, the organic particles further include second-type organic particles. The second-type organic particles are embedded into the inorganic particle layer and form bulges on a surface of the inorganic particle layer, and the second-type organic particles are primary particles. When the coating layer further includes the foregoing second-type organic particles, the cycling performance and safety performance of the battery can be further improved.

In any embodiment of this application, a number-based median particle size of the second-type organic particles is ≤10 µm and the number-based median particle size of the second-type organic particles is ≥2 µm; in some embodiments, the number-based median particle size of the second-type organic particles is 2.5 µm-6 µm. When the number-based median particle size of the second-type organic particles is within the foregoing range, the cycling performance and safety performance of the battery can be further improved.

In any embodiment of this application, a mass ratio of the second-type organic particles to the coating layer is below 10%, in some embodiments, 2%-10%.

In any embodiment of this application, the second-type organic particles include one or more of a homopolymer or copolymer of the acrylic monomer unit, a homopolymer or copolymer of the acrylic acid monomer unit, a homopolymer or copolymer of a styrene monomer unit, a polyurethane compound, a rubber compound, and modified compounds of the foregoing homopolymers or copolymers.

In any embodiment of this application, the second-type organic particles include one or more of a copolymer of an acrylic monomer unit and a styrene monomer unit, a copolymer of an acrylic acid monomer unit and the styrene monomer unit, a copolymer of the acrylic acid monomer unit, the acrylic monomer unit, and the styrene monomer unit, a copolymer of the styrene monomer unit and an unsaturated nitrile monomer unit, a copolymer of the styrene monomer unit, an alkylene monomer unit, and the unsaturated nitrile monomer unit, and modified compounds of the foregoing copolymers.

In any embodiment of this application, the second-type organic particles include one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the foregoing copolymers.

In any embodiment of this application, the thickness of the inorganic particle layer is ≤5 µm, in some embodiments, 1 µm-3 µm. When the thickness of the inorganic particle layer is within the foregoing range, the cycling performance and safety performance of the battery can be further improved.

In any embodiment of this application, a median volume-based particle size $D_v50$ of the inorganic particles is 0.5 µm-2.5 µm, in some embodiments, 0.5 µm-1 µm. When median volume-based particle size $D_v50$ of the inorganic particle layer is within the foregoing range, the cycling performance and safety performance of the battery can be further improved.

In any embodiment of this application, the inorganic particles include one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin oxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium dioxide ($CeO_2$), zirconium titanate ($SrTiO_3$), barium titanate ($BaTiO_3$), and magnesium fluoride ($MgF_2$).

In any embodiment of this application, the separator satisfies one or more of the following (1) to (5):
(1) an air permeability of the separator is 100 s/100 mL-300 s/100 mL; in some embodiments, the air permeability of the separator is 150 s/100 mL-250 s/100 mL;
(2) a tensile strength in transverse direction (MD) of the separator is 1500 kgf/cm²-3000 kgf/cm²; in some embodiments, the tensile strength in transverse direction of the separator is 1800 kgf/cm²-2500 kgf/cm²;
(3) a tensile strength in machine direction (TD) of the separator is 1000 kgf/cm²-2500 kgf/cm²; in some embodiments, the tensile strength in machine direction of the separator is 1400 kgf/cm²-2000 kgf/cm²;
(4) a transverse elongation at break of the separator is 50%-200%; in some embodiments, the transverse elongation at break of the separator is 100%-150%; and
(5) a longitudinal elongation at break of the separator is 50%-200%; in some embodiments, the longitudinal elongation at break of the separator is 100%-150%.

In any embodiment of this application, the inorganic particles and the organic particles form an uneven pore structure on the coating layer.

In any embodiment of this application, a distance between any two adjacent inorganic particles is recorded as L1, a distance between any one inorganic particle and any one organic particle that are adjacent is recorded as L2, and then L1<L2.

A second aspect of this application provides a method for preparing the separator according to the first aspect. The method includes at least the following steps:
(1) providing a substrate;
(2) providing coating layer slurry, where the coating layer slurry includes component materials and a solvent, the component materials include organic particles and inorganic particles, and the organic particles include first-type organic particles; and
(3) applying the coating layer slurry described in step (2) to at least one side of the substrate described in step (1) to form a coating layer, and drying the coating layer to obtain the separator.

The separator includes the substrate and the coating layer provided on at least one surface of the substrate. The coating layer includes the organic particles and the inorganic particles. The organic particles include the first-type organic particles, the inorganic particles form an inorganic particle layer, and the first-type organic particles are embedded into the inorganic particle layer and form bulges on a surface of the inorganic particle layer. A number-based median particle size of the first-type organic particles is ≥12 µm, and a ratio of an average height of the bulges to a thickness of the inorganic particle layer is ≥4.

In any embodiment of this application, in step (2), the organic particles further include second-type organic particles. The second-type organic particles are embedded into the inorganic particle layer and form bulges on a surface of the inorganic particle layer, and the second-type organic particles are primary particles.

In any embodiment of this application, a number-based median particle size of the second-type organic particles is ≤10 μm and the number-based median particle size of the second-type organic particles is ≥2 μm; in some embodiments, the number-based median particle size of the second-type organic particles is 2.5 μm-6 μm.

In any embodiment of this application, a ratio of added mass of the second-type organic particles to a total dry weight of the component materials is below 10%, in some embodiments, 2%-10%.

The separator preparation method according to the second aspect of this application satisfies one or more of the following (1) to (7):
 (1) in step (2), a ratio of added mass of the first-type organic particles to the total dry weight of the component materials is above 12%, in some embodiments, 12%-30%;
 (2) in step (2), solid content of the coating layer slurry is 28%-45% by weight, in some embodiments, 30%-38%;
 (3) in step (3), the coating is performed by using a coater, where the coater includes a gravure roller, and the line count of the gravure roller is 100LPI-300LPI, in some embodiments, 125LPI-190LPI;
 (4) in step (3), a speed of the coating is 30 m/min-90 m/min, in some embodiments, 50 m/min-70 m/min;
 (5) in step (3), a line speed ratio of the coating is 0.8-2.5, in some embodiments, 0.8-1.5;
 (6) in step (3), a temperature of the drying is 40° C.-70° C., in some embodiments, 50° C.-60° C.; and
 (7) in step (3), a time of the drying is 10 s-120 s, in some embodiments, 20 s-80 s.

A third aspect of this application provides a secondary battery, including the separator in the first aspect of this application or the separator prepared by using the method in the second aspect of this application.

A fourth aspect of this application provides a battery module, including the secondary battery in the third aspect of this application.

A fifth aspect of this application provides a battery pack, including the battery module in the fourth aspect of this application.

A sixth aspect of this application provides an apparatus. The apparatus includes at least one of the secondary battery in the third aspect of this application, the battery module in the fourth aspect of this application, or the battery pack in the fifth aspect of this application.

The secondary battery, the battery module, the battery pack, and the apparatus in this application contain the separator provided by this application, and therefore have at least the same advantages as the separator in this application.

BRIEF DESCRIPTION OF DRAWINGS

To describe the technical solutions in this application more clearly, the following briefly describes the accompanying drawings used in this application. Apparently, the accompanying drawings in the following description show merely some embodiments of this application, and a person of ordinary skill in the art may still derive other drawings from these accompanying drawings without creative efforts.

FIG. 1-2 is a schematic structural diagram of another embodiment of the separator in this application.

FIG. 2 is a scanning electron microscope (SEM) image of an embodiment of the separator in this application.

FIG. 3-1 is an ion polishing cross-sectional topography (CP) image of an embodiment of the separator in this application.

FIG. 3-2 is an ion polishing cross-sectional topography (CP) image of another embodiment of the separator in this application.

FIG. 4-1 is a schematic structural diagram of an embodiment of the separator in this application.

FIG. 4-2 is a schematic structural diagram of another embodiment of the separator in this application.

DETAILED DESCRIPTION OF EMBODIMENTS

Figure 1:
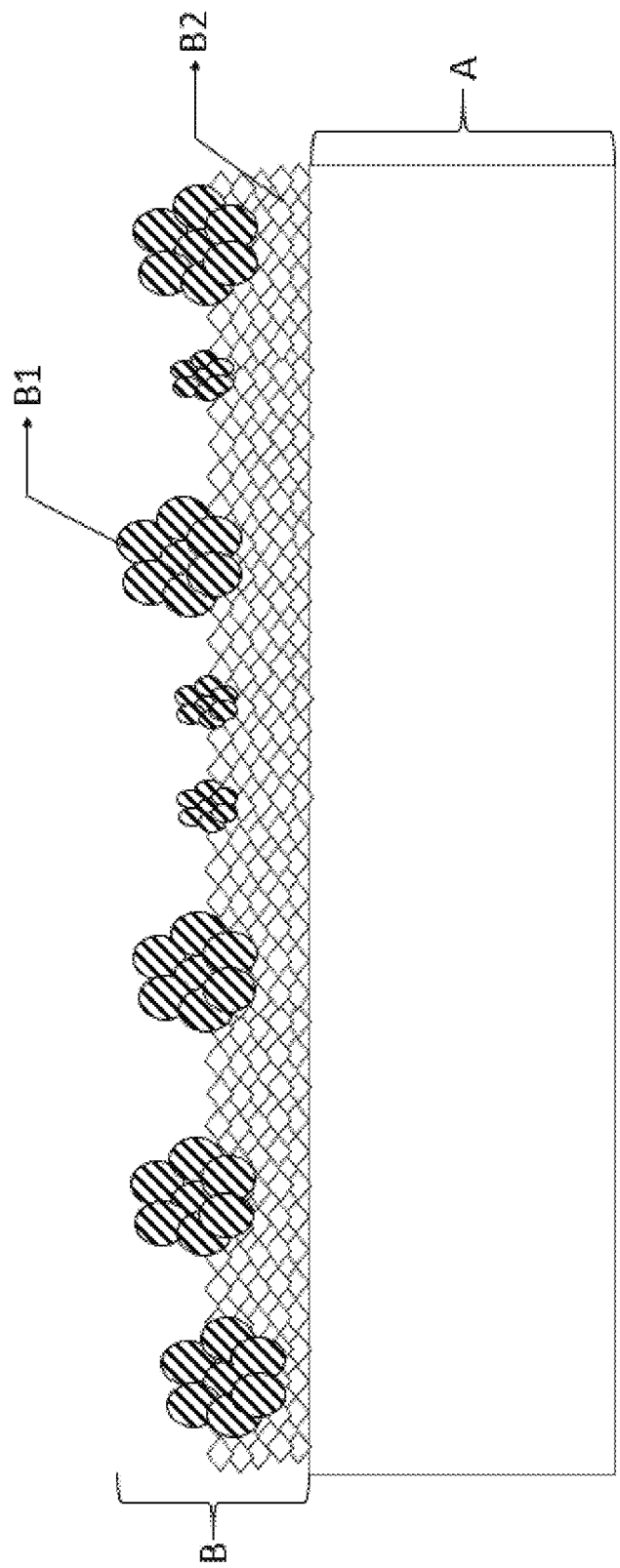
FIG. 1-1 is a schematic structural diagram of an embodiment of the separator in this application.

The following further describes this application with reference to embodiments. It should be understood that these specific embodiments are merely intended to illustrate this application but not to limit the scope of this application.

For brevity, this specification specifically discloses only some numerical ranges. However, any lower limit can form an unspecified range together with any upper limit. Any lower limit can form an unspecified range with any other lower limit. Similarly, any upper limit can form an unspecified range with any other upper limit. In addition, each point or individual value may act as its own lower limit or upper limit to be combined with any other point or individual value or combined with any other lower limit or upper limit to form a range not expressly recorded.

In the description of this specification, it should be noted that, unless otherwise stated, "above" and "below" means inclusion of the number itself, and "more" in "one or more" means at least two.

In the description of this specification, unless otherwise stated, a term "or (or)" indicates inclusion. That is, a phrase "A or (or) B" means "A, B, or both A and B". More specifically, any one of the following conditions satisfies the condition "A or B": A is true (or present) and B is false (or not present); A is false (or not present) and B is true (or present); or both A and B are true (or present).

Unless otherwise specified, terms used in this application have well-known meanings generally understood by persons skilled in the art. Unless otherwise specified, numerical values of parameters mentioned in this application may be measured by using various measurement methods commonly used in the art (for example, testing may be performed by using a method provided in the embodiments of this application).

Secondary Battery

A secondary battery is a battery that can be charged after being discharged to activate active materials for continuous use.

Generally, the secondary battery includes a positive-electrode plate, a negative-electrode plate, a separator, and an electrolyte. During charging and discharging of the battery, active ions are intercalated and deintercalated back and forth between the positive-electrode plate and the negative-electrode plate. The separator is sandwiched between the positive-electrode plate and the negative-electrode plate for isolation. The electrolyte is between the positive-electrode plate and the negative-electrode plate, and plays a role of conducting ions.

Separator

This application provides a separator, which includes a substrate and a coating layer provided on at least one surface of the substrate. The coating layer includes organic particles and inorganic particles. The organic particles include first-type organic particles, the inorganic particles form an inorganic particle layer, and the first-type organic particles are embedded into the inorganic particle layer and form bulges on a surface of the inorganic particle layer. A number-based median particle size of the first-type organic particles is $\geq 12$ μm. A ratio of an average height of the bulges to a thickness of the inorganic particle layer is $\geq 4$.

It should be noted that a number-based median particle size of the organic particles is an arithmetic mean value of particle sizes of the organic particles, which is counted based on a quantity of organic particles in the coating layer of the separator. A particle size of an organic particle refers to a distance between two farthest points of the organic particle.

The separator in this application includes the inorganic particles and the first-type organic particles in the same coating layer, and an overall thickness of the separator is greatly reduced compared with a separator having two coating layers, namely an inorganic particle layer and an organic particle layer, thereby improving energy density of a battery. Furthermore, a special design is applied to the first-type organic particles, so that a battery containing the separator in this application provides good cycling performance and safety performance. It is not expected to be bound by any theory. A possible cause lies in that: the inorganic coating layer of the separator has sufficient uneven pores to ensure open transmission channels for ions, and the first-type organic particles provide good adhesion and contact between the separator and electrode plates, thereby effectively improving the cycling performance of the battery. In addition, during operation at high temperatures, the first-type organic particles can form a large quantity of glue film structures, which can reduce ion transmission channels and delay heat transfer, thereby improving safety performance of the battery.

As shown in FIG. 1-1, the separator includes a substrate (A) and a coating layer (B). The coating layer (B) includes first-type organic particles (B1) and inorganic particles (B2). The first-type organic particles (B1) are secondary particles, and the first-type organic particles are embedded into an inorganic particle layer formed by the inorganic particles (B2) and form bulges on a surface of the inorganic particle layer.

Through research, the applicant has found that, on the basis of the foregoing design conditions, the separator in this application can further improve performance of a secondary battery containing the separator in this application when the separator satisfies one or more of the following conditions.

In some embodiments, a ratio of an average height of the bulges to a thickness of the inorganic particle layer is 4-20, in some embodiments, 5-15. When the ratio of the average height of the bulges to the thickness of the inorganic particle layer is within the foregoing range, the cycling performance and safety performance of the battery can be further improved. Through a lot of researches, the inventor has found that, an excessively small ratio of the average height of the bulges to the thickness of the inorganic particle layer is not good for gas exhaustion during a formation step in a battery preparation procedure and gas may hinder ion transmission during battery charging, which causes black spots on a surface of a negative-electrode plate and affects the cycling performance of the battery; and that an excessively large ratio of the average height of the bulges to the thickness of the inorganic particle layer may lead to enlarged ion transmission paths, and lithium is subject to precipitation on the surface of the negative-electrode plate, thereby affecting the safety performance of the battery.

In some embodiments, the average height of the bulges is $\geq 10$ μm, in some embodiments, 12 μm-18 μm. When the average height of the bulges is within the foregoing range, adhesion between the separator and electrode plates is sufficient and risks of wrinkling the separator during the battery preparation procedure is reduced. This effectively reduces the possibility of a short circuit between positive and negative electrodes and thereby further improves the safety performance of the battery.

In some embodiments, particle sizes of the first-type organic particles are 8 μm-35 μm. When the particle sizes of the first-type organic particles are within the foregoing range, a lot of pore structures will be formed to improve the ion transmission performance of the separator. It should be noted that, in this application, the particle sizes of the first-type organic particles being $\geq 8$ μm means that among all the first-type organic particles in use, a particle size of every single first-type organic particle is $\geq 8$ μm, for example, 8 μm, 10 μm, or 12 μm.

In some embodiments, the number-based median particle size of the first-type organic particles is 15 μm-25 μm. When the number-based median particle size of the first-type organic particles is within the foregoing range, particle size distribution of the first-type organic particles is relatively even, which helps form a relatively uniform coating layer interface in a premise of achieving the technical effects of this application.

In some embodiments, the first-type organic particles are secondary particles. The first-type organic particles being secondary particles helps form a uniform coating layer interface. When the separator is used in a battery, the problem of tab dislocation during battery preparation can be mitigated, thereby further improving the safety performance of the battery.

It should be noted that the primary particle and secondary particle have meanings known in the art. The primary particles are particles not in an agglomerated state. The secondary particles are particles in the agglomerated state, which are formed by two or more agglomerated primary particles.

In some embodiments, the first-type organic particles may be formed by agglomerating primary particles whose particle size is 150 nm-300 nm.

In some embodiments, the first-type organic particles include one or more of a homopolymer or copolymer of a fluorinated alkenyl monomer unit, a homopolymer or copolymer of an alkylene monomer unit, a homopolymer or copolymer of an unsaturated nitrile monomer unit, a homopolymer or copolymer of an alkylene oxide monomer unit, and modified compounds of the foregoing homopolymers or copolymers.

In some embodiments, the first-type organic particles include one or more of polytetrafluoroethylene, polytrifluorochloroethylene, polyfluoroethylene, polyvinylidene fluoride, polyethylene, polypropylene, polyacrylonitrile, polyethylene oxide, a copolymer of different fluorinated alkenyl monomer units, a copolymer of the fluorinated alkenyl monomer unit and the alkylene monomer unit, a copolymer of the fluorinated alkenyl monomer unit and an acrylic acid monomer unit, a copolymer of the fluorinated alkenyl monomer unit and an acrylic monomer unit, and modified compounds of the foregoing homopolymers or copolymers.

In some embodiments, the first-type organic particles include one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of the foregoing copolymers.

In some embodiments, the first-type organic particles are one or more of polyvinylidene fluoride, a vinylidene fluoride-hexafluoropropylene copolymer, and modified compounds of the foregoing homopolymers or copolymers.

In some embodiments, the separator satisfies at least one of the following (1) and (2):
(1) a mass ratio of the first-type organic particles to the coating layer is ≥12%, in some embodiments, 15%-25%; and
(2) a mass ratio of the inorganic particles to the coating layer is ≤85%, in some embodiments, 60%-75%.

When an appropriate amount of organic particles and inorganic particles is selected for use, synergy between the organic particles and the inorganic particles can be better achieved. In this case, the separator can provide appropriate uneven pore structures to reduce its weight while ensuring the safety performance, thereby further improving the energy density of the battery.

In some embodiments, the organic particles further include second-type organic particles. The second-type organic particles are embedded into the inorganic particle layer and form bulges on a surface of the inorganic particle layer, and the second-type organic particles are primary particles. When the battery works in a normal environment (for example, below 45° C.), combined use of the first-type organic particles and the second-type organic particles can effectively reduce the possibility that organic particles in the coating layer form a large dense glue film after being swollen in the electrolyte. In this way, the coating layer of the separator provides moderately uneven pore structures, which facilitates transmission of active ions, thereby further improving the cycling performance of the battery. Particularly, when the battery works at a high temperature (for example, above 100° C.), the first-type organic particles and the second-type organic particles develop large-area glue film structures at the high temperature, which rapidly reduce spreading channels of active ions and delay heat transfer, thereby further improving the safety performance of the battery.

Figures 1, 2:
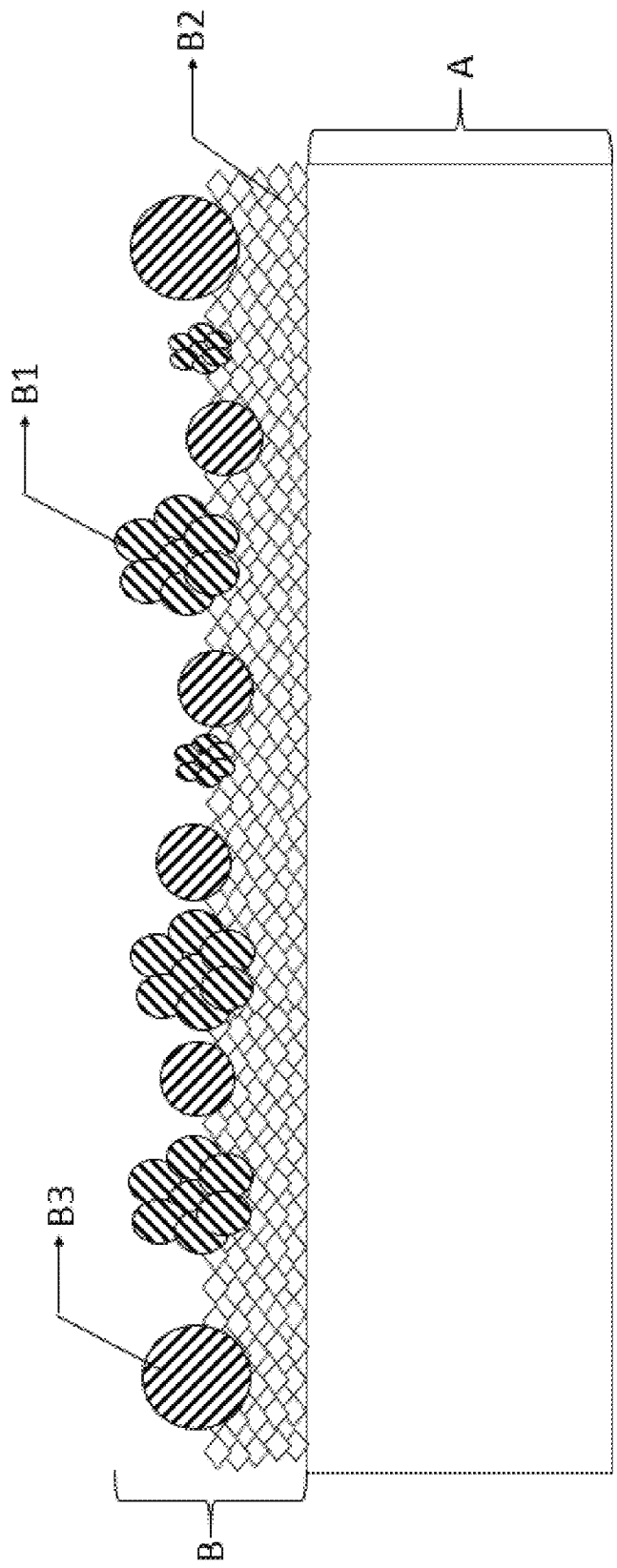
Figure 2:
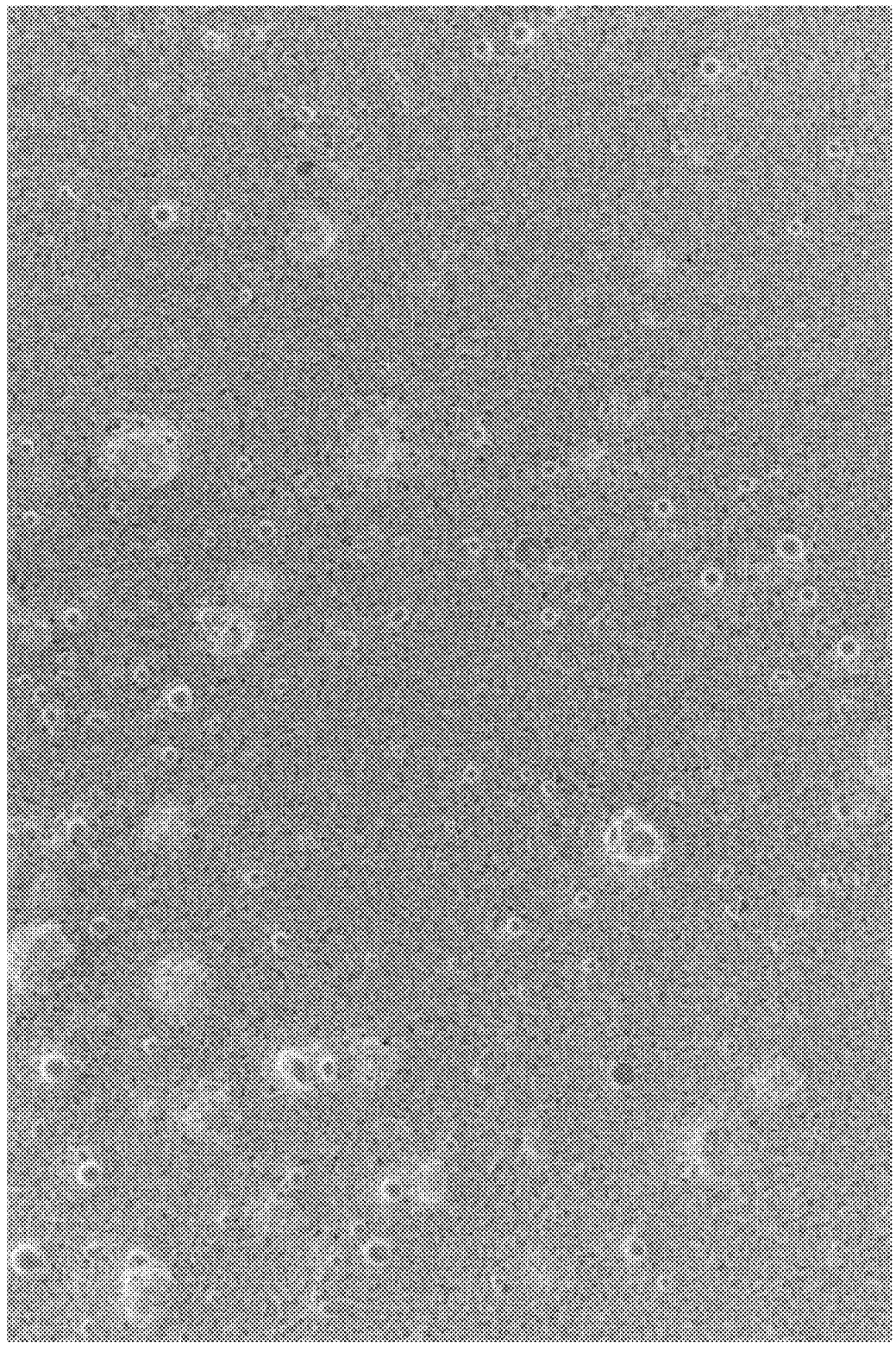

As shown in FIG. 1-2, the separator includes a substrate (A) and a coating layer (B). The coating layer (B) includes first-type organic particles (B1), inorganic particles (B2), and second-type organic particles (B3). The first-type organic particles (B1) are secondary particles, the second-type organic particles (B3) are primary particles, and the first-type organic particles (B1) and the second-type organic particles (B3) are embedded into an inorganic particle layer formed by the inorganic particles (B2) and form bulges on a surface of the inorganic particle layer.

In some embodiments, a number-based median particle size of the second-type organic particles is ≤10 μm and the number-based median particle size of the second-type organic particles is ≥2 μm; in some embodiments, the number-based median particle size of the second-type organic particles is 2.5 μm-6 μm. When the number-based median particle size of the second-type organic particles is within the given range, cycling performance and safety performance of the battery can be further improved. If the number-based median particle size of the second-type organic particles is excessively small (for example, smaller than 2 μm), the second-type organic particles tend to swell in an electrolyte and form a glue film structure to block ion transmission channels when the battery is working properly, thereby affecting the cycling performance of the battery. If the number-based median particle size of the second-type organic particles is excessively large (for example, larger than 10 μm), the second-type organic particles may cause excessive adhesion between the separator and electrode plates after hot pressing in battery preparation. This results in poor infiltration of the electrolyte, thereby affecting the cycling performance of the battery.

In some embodiments, a mass ratio of the second-type organic particles to the coating layer is below 10%. For example, the mass ratio of the second-type organic particles to the coating layer is 2%-10%, 3%-8%, 4%-9%, or 5%-10%. When the mass ratio of the second-type organic particles to the coating layer is within the given range, it helps the coating layer of the separator provide appropriate pore structures while ensuring adhesion, thereby further improving the cycling performance and safety performance of the battery.

In some embodiments, the second-type organic particles include one or more of a homopolymer or copolymer of the acrylic monomer unit, a homopolymer or copolymer of the acrylic acid monomer unit, a homopolymer or copolymer of a styrene monomer unit, a polyurethane compound, a rubber compound, and modified compounds of the foregoing homopolymers or copolymers.

In some embodiments, the second-type organic particles include one or more of a copolymer of an acrylic monomer unit and a styrene monomer unit, a copolymer of an acrylic acid monomer unit and the styrene monomer unit, a copolymer of the acrylic acid monomer unit, the acrylic monomer unit, and the styrene monomer unit, a copolymer of the styrene monomer unit and an unsaturated nitrile monomer unit, a copolymer of the styrene monomer unit, an alkylene monomer unit, and the unsaturated nitrile monomer unit, and modified compounds of the foregoing copolymers.

In some embodiments, the acrylic acid monomer unit may be selected from one or more of acrylic acid and methacrylate.

In some embodiments, the styrene monomer unit may be selected from one or more of styrene and methyl styrene.

In some embodiments, the unsaturated nitrile monomer unit may be selected from one or more of acrylonitrile and methacrylonitrile.

In some embodiments, the second-type organic particles include one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the foregoing copolymers.

In some embodiments, a thickness of the inorganic particle layer is ≤5 μm, for example, 0.5 μm-4 μm, 1 μm-3 μm, 0.8 μm-3.5 μm, or 1.5 μm-4.5 μm. When the thickness of the inorganic particle layer is within the foregoing range, the battery can have a high energy density and better safety performance.

In some embodiments, a median volume-based particle size $D_v50$ of the inorganic particles is 0.5 μm-2.5 μm, in some embodiments, 0.5 μm-1 μm. When the median volume-based particle size of the inorganic particles is within the given range, it helps improve infiltration of the electrolyte in the separator, thereby further improving the cycling performance of the battery.

In some embodiments, the inorganic particles include one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin oxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium dioxide ($CeO_2$), zirconium titanate ($SrTiO_3$), barium titanate ($BaTiO_3$), and magnesium fluoride ($MgF_2$). For example, in some embodiments, the inorganic particles are selected from one or more of boehmite ($\gamma$-AlOOH) and aluminum oxide ($Al_2O_3$).

According to some embodiments, the coating layer may further include other organic compounds, for example, a polymer that improves heat resistance ("heat-resistant glue" for short), a dispersant, a wetting agent, or another type of binder. The foregoing other organic compounds are all non-granular substances in the coating layer. There is no particular limitation on types of the foregoing other organic compounds in this application, and any commonly known materials good for performance improvement can be selected.

There is no particular limitation on the material of the substrate in the embodiments of this application, and any commonly known substrates with good chemical stability and mechanical stability, for example, one or more of glass fiber, non-woven fabric, polyethylene, polypropylene and polyvinylidene fluoride, can be selected. The substrate may be a single-layer film or a multilayer composite film. When the substrate is a multilayer composite film, each layer may be made of the same material or different materials.

In some embodiments, a thickness of the substrate is ≤10 μm, for example, the thickness of the substrate may be 5 μm-10 μm, 5 μm-9 μm, or 7 μm-9 μm. When the thickness of the substrate is within the given range, the energy density of the battery can be further improved while rate performance and safety performance of the battery are ensured.

In some embodiments, a coating layer weight on one side of the separator per unit area is 3.0 g/m². For example, the coating layer weight on one side of the separator per unit area may be 1.5 g/m²-3.0 g/m², 1.5 g/m²-2.5 g/m², or 1.8 g/m²-2.3 g/m². When the coating layer weight on one side of the separator per unit area is within the given range, the energy density of the battery can be further improved while the cycling performance and safety performance of the battery are ensured.

In some embodiments, the separator satisfies one or more of the following (1) to (5):
(1) an air permeability of the separator is 100 s/100 mL-300 s/100 mL; in some embodiments, the air permeability of the separator is 150 s/100 mL-250 s/100 mL or 170 s/100 mL-220 s/100 mL;
(2) a tensile strength in transverse direction (MD) of the separator is 1500 kgf/cm²-3000 kgf/cm²; in some embodiments, the tensile strength in transverse direction of the separator is 1800 kgf/cm²-2500 kgf/cm²;
(3) a tensile strength in machine direction (TD) of the separator is 1000 kgf/cm²-2500 kgf/cm²; in some embodiments, the tensile strength in machine direction of the separator is 1400 kgf/cm²-2000 kgf/cm²;
(4) a transverse elongation at break of the separator is 50%-200%; in some embodiments, the transverse elongation at break of the separator is 100%-150%; and
(5) a longitudinal elongation at break of the separator is 50%-200%; in some embodiments, the longitudinal elongation at break of the separator is 100%-150%.

In some embodiments, a distance between any two adjacent inorganic particles is recorded as L1, a distance between any one inorganic particle and any one organic particle that are adjacent is recorded as L2, and then L1<L2.

Related Parameter Test Method

According to some embodiments, the particle sizes and the number-based median particle size of the organic particles can be tested by using a device and methods known in the art. For example, a scanning electron microscope (for example, ZEISS Sigma 300) is used, with reference to JY/T010-1996, to obtain a scanning electron microscope (SEM) image of the separator. As an example, the test method may be as follows: randomly selecting a test sample whose length×width=50 mm×100 mm from the separator, selecting a plurality of test regions (for example, 5) randomly on the test sample, reading a particle size of each organic particle in each test region (that is, using a largest distance between two points on an organic particle as the particle size of the organic particle) at a specific magnification (for example, 500 times for measuring the first-type organic particles and 1000 times for measuring the second-type organic particles), counting a quantity and particle size values of the organic particles in each test region, and obtaining an arithmetic mean of the particle sizes of the organic particles in each test region. The arithmetic mean value is the number-based median particle size of the organic particles in the test sample. To ensure accuracy of the test results, a plurality (for example, 10 pieces) of test samples can be selected for repeating the foregoing test, and a mean value for all the test samples is used as a final test result.

FIG. 2 is a scanning electron microscope (SEM) image of an embodiment of the separator in this application. It can be seen from FIG. 2 that the coating layer of the separator includes the first-type organic particles and the second-type organic particles, and the first-type organic particles and the second-type organic particles are embedded into the inorganic particle layer and form bulges on a surface of the inorganic particle layer. The particle sizes and the number-based median particle size of the organic particles can be measured as FIG. 2 by using the foregoing method.

It should be noted that a height of a bulge is the height of the bulge formed by the first-type organic particles in the thickness direction of the inorganic particle layer. The height is the largest distance between the "bulge" and "a surface, away from the substrate, of the inorganic particle layer".

An average height of the bulges is an arithmetic mean of the heights of the bulges counted based on the quantity of the bulges.

According to some embodiments, the average height of the bulges can be tested by using a device and methods known in the art. For example, it can be tested based on an ion polishing cross-sectional topography (CP) image. As an example, the test can be performed according to the following steps: cutting the separator into to-be-tested samples of a specific size (for example, 6 mm×6 mm), clamping the to-be-tested sample by using two electrically and thermally conductive sheets (for example, copper foils), fixing the to-be-tested sample and the sheets by using glue (for example, a double-sided tape), pressing the to-be-tested sample and the sheets by using a flat iron block with specific mass (for example, approximately 400 g) for a specific period of time (for example, 1 h) to reduce a gap between the to-be-tested sample and the sheets to be as small as possible, trimming edges with scissors, attaching the sample on the sample stage by using conductive glue, where the sample slightly protrudes from the edge of the sample stage, placing the sample stage in a sample holder and locking the sample holder firmly, powering on an argon ion cross-section polisher (for example, IB-19500CP) and performing evacuation (for example, 10 Pa-4 Pa), setting argon flow (for example, 0.15 MPa), voltage (for example, 8KV), and polishing time (for example, 2 hours), adjusting the sample stage to rocking mode to start polishing, and obtaining the ion polishing cross-sectional topography (CP) image of the to-be-tested sample by using a scanning electron microscope (for example, ZEISS Sigma 300). The quantity of bulges, in the ion-polished cross-sectional topography (CP) image, formed by organic particles and the heights of the bulges are obtained through statistics collection. The foregoing test is repeated on a plurality of test samples (for example, 10 pieces). An arithmetic mean of heights of all bulges in every test sample (a ratio of a sum of heights of all bulges to the quantity of bulges) is calculated and used as a final test result for the average height of the bulges formed by the organic particles.

According to some embodiments, the thickness of the inorganic particle layer can also be tested based on the foregoing ion polishing cross-sectional topography (CP) image. To ensure accuracy of the test result, a plurality (for example, 10 pieces) of test samples can be selected for repeating the foregoing test, and an average value of the thickness of the inorganic layer for all the test samples is used as a final test result.

According to some embodiments, morphology of the organic particles (for example, morphology of the primary particles or morphology of the secondary particles) can also be tested based on the foregoing ion polishing cross-sectional topography (CP) image.

Figures 1, 3:
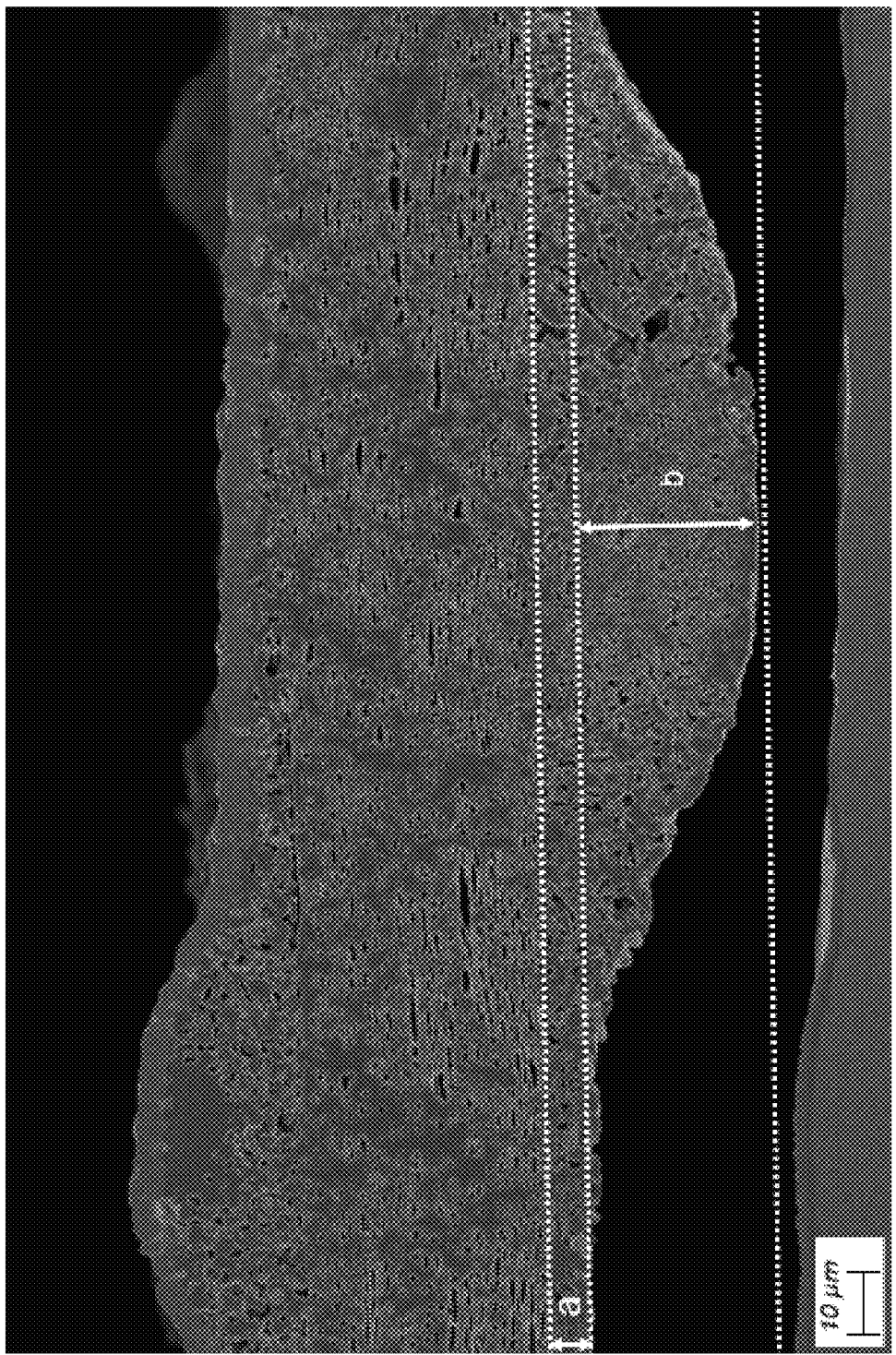
Figures 2, 3:
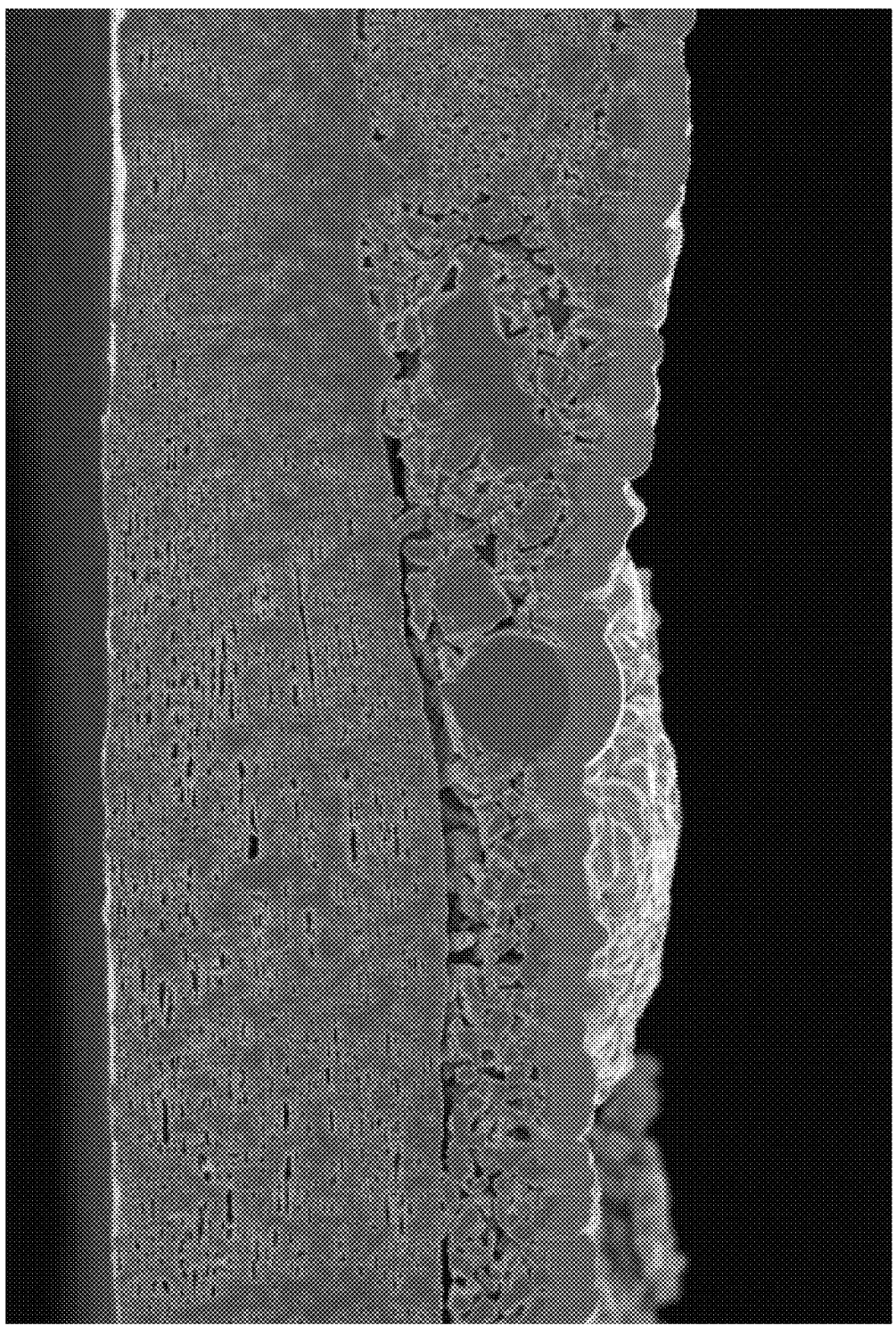

FIG. 3-1 and FIG. 3-2 are ion polishing cross-sectional topography (CP) images of the separator in an embodiment of this application.

It can be seen from FIG. 3-1 that a coating layer of the separator includes first-type organic particles. The first-type organic particle is a secondary particle formed by a plurality of primary particles, and has an irregular non-solid-sphere cross section. Based on FIG. 3-1, a thickness (a) of the inorganic particle layer and a height (b) of a bulge can be both measured.

It can be seen from FIG. 3-2 that a coating layer of the separator includes first-type organic particles and second-type organic particles. The second-type organic particles are non-agglomerated primary particles, and have a solid-sphere cross section.

According to some embodiments, a substance category of the organic particles can be tested by using a device and methods known in the art. For example, infrared spectrum of a material can be tested to determine characteristic peaks that the material contains, so as to determine a substance category. In particular, infrared spectroscopy can be performed on the organic particles by using instruments and methods known in the art, for example, an infrared spectrometer. For example, the test is performed by using an IS10 Fourier transform infrared spectrometer from Nicolet (Nicolet) of the USA, according to general rules of GB/T6040-2002 infrared spectroscopy method.

According to some embodiments, a median volume-based particle size $D_v50$ of inorganic particles has a meaning know in the art, and can be tested by using instruments and methods known in the art. For example, it can be tested by using a laser particle size analyzer (for example, Master Size 3000) referring to GB/T 19077-2016 particle size distribution laser diffraction method.

According to some embodiments, the air permeability, tensile strength in transverse direction (MD), tensile strength in machine direction (TD), transverse elongation at break, and longitudinal elongation at break of the separator all have meanings known in the art, and can be measured by using methods known in the art. For example, testing can be conducted according to GB/T 36363-2018.

According to some embodiments, a distance between any two adjacent inorganic particles means that: on a SEM image of the separator, any two adjacent inorganic particles (when inorganic particles are of an irregular shape, the particles can be circumscribed) in the coating layer are selected randomly, a center distance of the two inorganic particles is used as the distance between the inorganic particles, and the center distance is tested and recorded as L1.

According to some embodiments, a distance between any one inorganic particle and any one organic particle that are adjacent means that: on a SEM image of the separator, one inorganic particle and one organic particle (when the inorganic particle or the organic particle is of an irregular shape, the particle can be circumcircled) that are adjacent in the coating layer are selected randomly, a center distance between the inorganic particle and the organic particle is used as the distance between the inorganic particle and the organic particle, and the center distance is tested and recorded as L2. The foregoing organic particles can be the first-type organic particles or the second-type organic particles.

The foregoing distances can be tested by using instruments known in the art. For example, a scanning electron microscope may be used for testing. As an example, the distance L2 between any one inorganic particle and any one organic particle that are adjacent can be tested by using the following method: making the separator into test samples whose length×width=50 mm×100 mm, where a scanning electron microscope (for example, ZEISS Sigma300) is used to test the separator and JY/T010-1996 can be used as a reference; selecting randomly a region on a test sample for a scan test, obtaining a SEM image of the separator at a specific magnification (for example, 3000 times), selecting any one inorganic particle and any one organic particle (when the inorganic particle or the organic particle is of an irregular shape, the particle can be circumcircled) that are adjacent on the SEM image, and measuring a distance between a circle center of the inorganic particle (or its circumcircle) and a circle center of the organic particle (or its circumcircle), so as to obtain the distance between the organic particle and the inorganic particle that are adjacent in this application, which is recorded as L2. To ensure accuracy of the test result, a repeating the foregoing test, and a mean value for all the test samples is used as a final test result.

Likewise, the foregoing method can also be used to test the distance between any two adjacent inorganic particles L1.

The foregoing "circumcircle" means that an irregularly-shaped object is enclosed by a sphere, and vertices and arc surfaces of the irregularly-shaped object are on the circle.

Preparation Method of Separator

A second aspect of this application provides a separator preparation method. The method includes at least the following steps:

(1) providing a substrate;
(2) providing coating layer slurry, where the coating layer slurry includes component materials and a solvent, the component materials include organic particles and inorganic particles, and the organic particles include first-type organic particles; and
(3) applying the coating layer slurry described in step (2) to at least one side of the substrate described in step (1) to form a coating layer, and drying the coating layer to obtain the separator.

The separator includes the substrate and the coating layer provided on at least one surface of the substrate. The coating layer includes the organic particles and the inorganic particles. The organic particles include the first-type organic particles, the inorganic particles form an inorganic particle layer, and the first-type organic particles are embedded into the inorganic particle layer and form bulges on a surface of the inorganic particle layer. A number-based median particle size of the first-type organic particles is ≥12 μm, and a ratio of an average height of the bulges to a thickness of the inorganic particle layer is ≥4.

The coating layer may be provided on one surface or two surfaces of the substrate.

Figures 1, 2, 4:
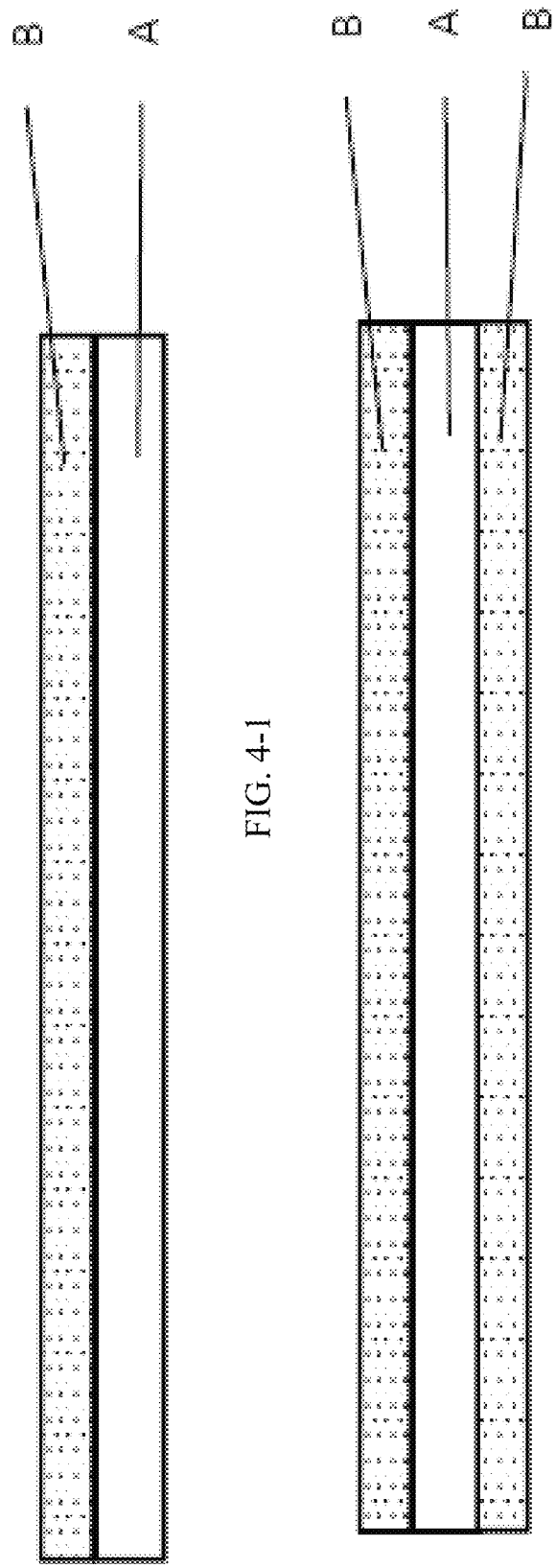

As shown in FIG. 4-1, the separator includes a substrate (A) and a coating layer (B), and the coating layer (B) is provided on one surface of the substrate (A).

As shown in FIG. 4-2, the separator includes a substrate (A) and a coating layer (B), and the coating layer (B) is provided on two surfaces of the substrate (A).

There is no particular limitation on material of the substrate in embodiments of this application, and any commonly known substrates with good chemical stability and mechanical stability, for example, one or more of glass fiber, non-woven fabric, polyethylene, polypropylene and polyvinylidene fluoride, can be selected. The substrate may be a single-layer film or a multilayer composite film. When the substrate is a multilayer composite film, each layer may be made of the same material or different materials.

In some embodiments, in step (2), the solvent may be water, for example, deionized water.

In some embodiments, in step (2), the component materials may further include the foregoing second-type organic particles. For parameters of the second-type organic particles, refer to the foregoing descriptions. Details are not described herein again.

In some embodiments, in step (2), the component materials may further include other organic compounds, for example, including a polymer that improves heat resistance, a dispersant, a wetting agent, or an emulsive binder. The other organic compounds are all non-granular in the dry coating layer.

In some embodiments, in step (2), the component materials are added to the solvent and stirred evenly to obtain the coating layer slurry.

In some embodiments, in step (2), a ratio of added mass of the first-type organic particles to a total dry weight of the component materials is above 12%, for example, 12%-30%, 15%-30%, 15%-25%, 15%-20%, or 16%-22%.

In some embodiments, in step (2), a ratio of added mass of the second-type organic particles to the total dry weight of the component materials is below 10%, for example, 2%-10%, 3%-7%, or 3%-5%.

It should be noted that when the component material is in a solid state, the dry weight of the component material is added mass of the component material. When the component material is are a suspension, an emulsion, or a solution, the dry weight of the component material is a product of the added mass of the component material and solid content by weight of the component materials. The total dry weight of the component materials is a sum of dry weights of all component materials.

In some embodiments, in step (2), a solid content by weight of the coating layer slurry may be 28%-45%, for example, 30%-38%. When the solid content of the coating layer slurry is within the foregoing range, a film surface problem of the coating layer and the probability of uneven coating can be effectively reduced, thereby further improving the cycling performance and safety performance of the battery.

In some embodiments, in step (3), the coating is performed by using a coater.

In the embodiments of this application, there is no particular limitation on the coater model, and a commercially available coater can be used.

In some embodiments, in step (3), the coating is performed by using a process such as transfer coating, rotary spraying, and dip coating. For example, the coating is performed by using transfer coating.

In some embodiments, the coater includes a gravure roller, and the gravure roller is used to transfer the coating layer slurry to the substrate.

In some embodiments, a line count of the gravure roller may be 100LPI-300LPI, for example, 125LPI-190LPI (LPI means lines/inch). When the line count of the gravure roller is within the foregoing range, it helps control quantities of the first-type organic particles and the second-type organic particles, further improving the cycling performance and safety performance of the separator.

In some embodiments, in step (3), a speed of the coating may be 30 m/min-90 m/min, for example, 50 m/min-70 m/min. When the coating speed is within the foregoing range, it helps adjust the average height of the bulges, so as to control the ratio of the average height of the bulges to the thickness of the inorganic particle layer to be within the given range. Furthermore, the film surface problem of the coating layer and the probability of uneven coating can be effectively reduced, thereby further improving the cycling performance and safety performance of the battery.

In some embodiments, in step (3), a line speed ratio of the coating may be 0.8-2.5, for example, 0.8-1.5 or 1.0-1.5.

In some embodiments, in step (3), a temperature of the drying may be 40° C.-70° C., for example, 50° C.-60° C.

In some embodiments, in step (3), a time of the drying may be 10 s-120 s, for example, 20 s-80 s or 20 s-40 s.

Performance of the separator can be further improved when the foregoing process parameters are controlled within the given ranges. Those skilled in the art can selectively adjust one or more of the foregoing process parameters according to actual production.

To further improve the performance of a secondary battery, the inorganic particles and the organic particles may satisfy one or more of the foregoing parameter conditions. No description is provided herein again.

The foregoing substrate, first-type organic particles, and second-type organic particles may be purchased from markets.

By using the separator preparation method in this application, the coating layer is obtained through one time of coating, which greatly simplifies the production process of the separator. Furthermore, the cycling performance and safety performance of the battery can be effectively improved when the separator prepared using the foregoing method is applied to the battery.

Positive-electrode Plate

In a secondary battery, the positive-electrode plate generally includes a positive-electrode current collector and a positive-electrode film layer provided on the positive-electrode current collector. The positive-electrode film layer includes a positive-electrode active material.

The positive-electrode current collector may use a common metal foil sheet or a composite current collector (the composite current collector can be made by providing a metal material on a polymer matrix). As an example, the positive-electrode current collector may use an aluminum foil.

A specific type of the positive-electrode active material is not limited. An active material known in the art can be used as the positive electrode of the secondary battery, and those skilled in the art may select an active material based on actual needs.

As an example, the positive-electrode active material may include, but is not limited to, one or more of lithium transition metal oxide, olivine-structured lithium-containing phosphate, and modified compounds thereof. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include, but are not limited to, one or more of lithium iron phosphate, lithium iron phosphate-carbon composite, lithium manganese phosphate, lithium manganese phosphate-carbon composite, lithium iron manganese phosphate, lithium iron manganese phosphate-carbon composite, and modified compounds thereof. These materials are commercially available.

In some embodiments, the modified compounds of the foregoing materials may be modified by doping or surface coating on the materials.

The positive-electrode film layer generally may include a binder, a conductive agent, or other optional additives.

As an example, the conductive agent may be one or more of superconducting carbon, acetylene black, carbon black, Ketjen black, carbon dot, carbon nanotube, Super P (SP), graphene, and carbon nanofiber.

As an example, the binder may be one or more of styrene-butadiene rubber (SBR), water-based acrylic resin (water-based acrylic resin), polyvinylidene fluoride (PVDF), polytetrafluoroethylene (PTFE), ethylene vinyl acetate (EVA), polyacrylic acid (PAA) carboxymethyl cellulose (CMC), polyvinyl alcohol (PVA), and polyvinyl butyral (PVB).

Negative-electrode Plate

In the secondary battery, the negative-electrode plate generally includes a negative-electrode current collector and a negative-electrode film layer provided on the negative-electrode current collector. The negative-electrode film layer includes a negative-electrode active material.

The negative-electrode current collector may use a common metal foil sheet or a composite current collector (for example, the composite current collector may be formed by providing a metal material on a polymer matrix). As an example, the negative-electrode current collector may use a copper foil.

A specific type of the negative-electrode active material is not limited. An active material known in the art can be used as the negative electrode of the secondary battery, and those skilled in the art may select an active material based on actual needs. As an example, the negative-electrode active material may include, but is not limited to, one or more of artificial graphite, natural graphite, hard carbon, soft carbon, silicon-based material, and tin-based material. The silicon-based material may be selected from one or more of elemental silicon, silicon-oxygen compound (for example, silicon monoxide), silicon-carbon composite, silicon-nitrogen composite, and silicon alloy. The tin-based material may be selected from one or more of elemental tin, tin-oxygen compound, and tin alloy. These materials are commercially available.

In some embodiments, the negative-electrode active material may include a silicon-based material to further improve energy density of the battery.

The negative-electrode film layer generally may include a binder, a conductive agent, or other optional additives.

As an example, the conductive agent may be one or more of superconducting carbon, acetylene black, carbon black, Ketjen black, carbon dot, carbon nanotube, graphene, and carbon nanofiber.

In an example, the binder is one or more of styrene-butadiene rubber (SBR), water-based acrylic resin (water-based acrylic resin), polyvinylidene fluoride (PVDF), polytetrafluoroethylene (PTFE), ethylene vinyl acetate (EVA), polyvinyl alcohol (PVA), and polyvinyl butyral (PVB).

As an example, other optional additives may be a thickening and dispersing agent (for example, sodium carboxymethyl cellulose CMC-Na) or a PTC thermistor material.

Electrolyte

The embodiments of this application have no particular limitation on selection of an electrolyte. The electrolyte is used to conduct ions between the positive-electrode plate and the negative-electrode plate. The electrolyte may include an electrolytic salt and a solvent.

As an example, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), and lithium tetrafluoro oxalato phosphate (LiTFOP).

As an example, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the electrolyte further includes an additive. For example, the additive may include a negative electrode film forming additive, or may include a positive electrode film-forming additive, or may include an additive capable of improving some performance of a battery, for example, an additive for improving over-charge performance of the battery, an additive for improving high-temperature performance of the battery, and an additive for improving low-temperature performance of the battery.

In some embodiments, the secondary battery in this application is a lithium-ion secondary battery.

Figure 5:
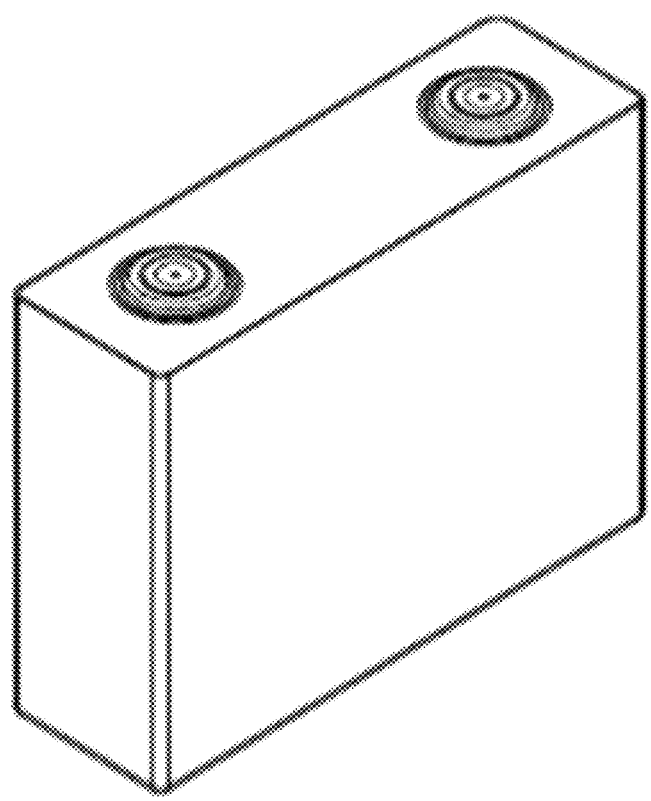
FIG. 5 is a schematic diagram of an embodiment of a secondary battery.

The embodiments of this application have no special limitations on a shape of the secondary battery, and the lithium-ion battery may be of a cylindrical shape, a rectangular shape, or any other shapes. FIG. 5 shows a secondary battery 5 of a rectangular structure as an example.

In some embodiments, the secondary battery may include an outer package. The outer package is used to package a positive electrode plate, a negative electrode plate, and an electrolyte.

Figure 6:
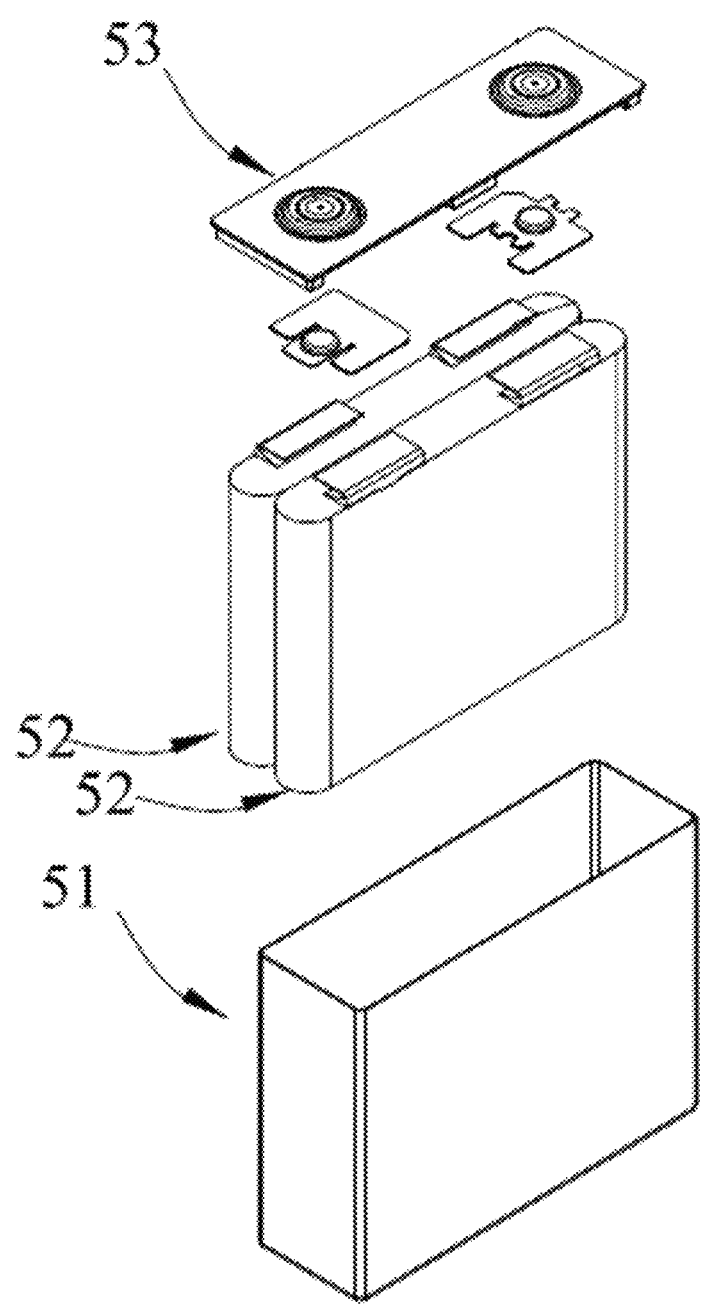
FIG. 6 is an exploded view of FIG. 5.

In some implementations, referring to FIG. 6, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity.

A positive electrode plate, a negative electrode plate, and a separator may be made into an electrode assembly 52 through winding or lamination. The electrode assembly 52 is packaged in the accommodating cavity. The electrolyte is infiltrated in the electrode assembly 52. There may be one or more electrode assemblies 52 in the secondary battery 5, and the quantity may be adjusted as required.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft package may be plastic, for example, may include one or more of polypropylene (PP), polybutylene terephthalate (PBT), polybutylene succinate (PBS), and the like.

In some implementations, the secondary batteries may be assembled into a battery module (Module). The battery module may include a plurality of secondary batteries, and a specific quantity may be adjusted based on application and capacity of the battery module.

Figure 7:
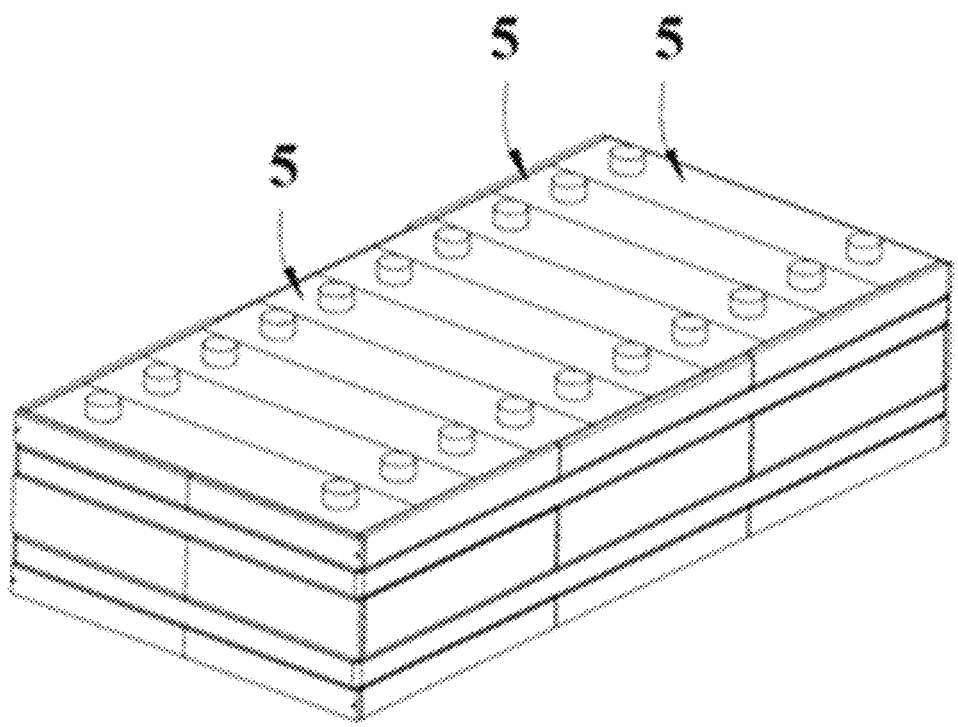
FIG. 7 is a schematic diagram of an embodiment of a battery module.

FIG. 7 shows a battery module 4 used as an example. Referring to FIG. 7, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the battery module may be further assembled into a battery pack (Pack), and a quantity of battery modules included in the battery pack may be adjusted based on application and capacity of the battery pack.

Figure 8:
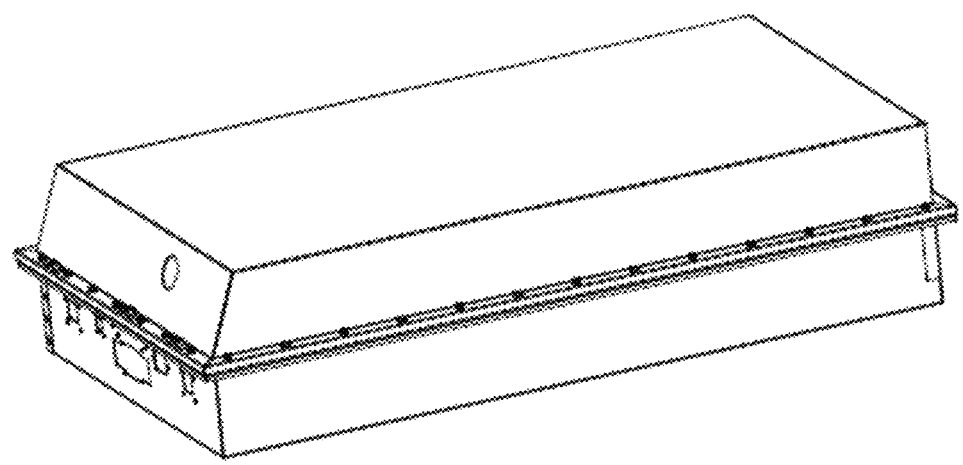
FIG. 8 is a schematic diagram of an embodiment of a battery pack.
Figure 9:
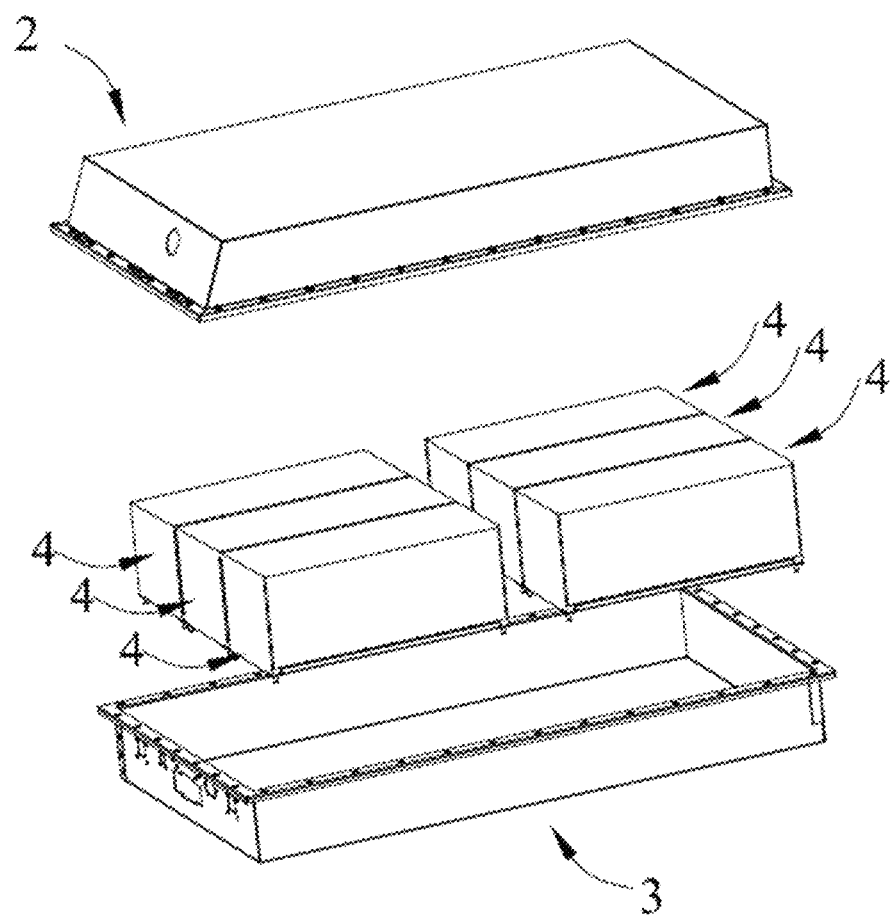
FIG. 9 is an exploded view of FIG. 8.

FIG. 8 and FIG. 9 show a battery pack 1 used as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

This application further provides an apparatus. The apparatus includes at least one of the secondary battery, the battery module, or the battery pack. The secondary battery, the battery module, or the battery pack may be used as a power source of the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 10:
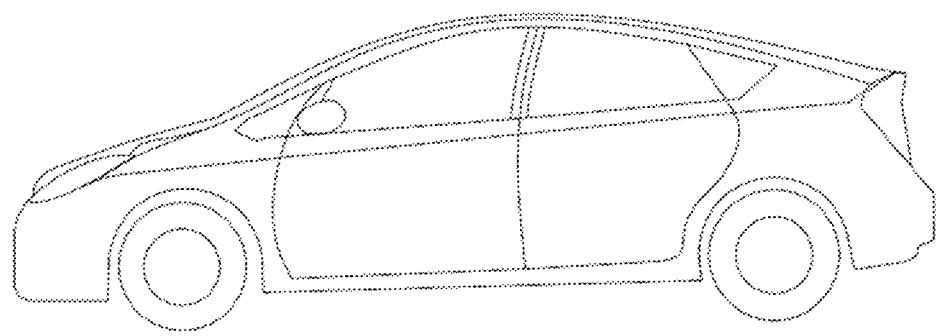
FIG. 10 is a schematic diagram of an embodiment of an apparatus using a secondary battery as a power source.

FIG. 10 shows an apparatus used as an example. The device is a battery electric vehicle, a hybrid electric vehicle, a plug-in hybrid electric vehicle, or the like. To meet requirements of the device for high power and high energy density of secondary batteries, a battery pack or a battery module may be used.

In another example, the device may be a mobile phone, a tablet computer, a notebook computer, or the like. Such device is generally required to be light and thin, and may use a secondary battery as its power source.

The following further describes beneficial effects of this application with reference to examples.

EXAMPLES

To describe the technical problems solved by this application, technical solutions, and beneficial effects of this application more clearly, the following further describes this application in detail with reference to the examples and accompanying drawings. Apparently, the described examples are merely some but not all of the examples of this application. The following description of at least one exemplary embodiment is merely illustrative and definitely is not construed as any limitation on this application or on use of this application. All other examples obtained by a person of ordinary skill in the art based on the examples of this application without creative efforts shall fall within the protection scope of this application.

All materials used in this application were commercially available.

For example, the substrate may be purchased from Shanghai Energy New Material Technology Co., Ltd.

The inorganic particles may be purchased from Estone Materials Technology Co., Ltd.

The first-type organic particles may be purchased from Arkema (Changshu) Chemicals Co., Ltd.

The second-type organic particles may be purchased from Sichuan Indigo Technology Co., Ltd.

The heat-resistant glue may be purchased from Sichuan Indigo Technology Co., Ltd.

The wetting agent may be purchased from Dow Chemical Company.

The dispersant was purchased from Changshu Wealthy Science and Technology Co., Ltd.

I. Preparation of Separator

Separator 1

(1) A polyethylene (PE) substrate was provided. For example, a thickness of the substrate was 7 μm, and a porosity was 36%.

(2) Coating layer slurry was prepared. Inorganic particles aluminum oxide ($Al_2O_3$), first-type organic particles vinylidene fluoride-hexafluoropropylene copolymer (a number-average molecular weight was 550,000), a heat-resistant adhesive acrylic acid-acrylonitrile copolymer, a dispersant sodium carboxymethyl cellulose (CMC-Na), a wetting agent silicone-modified polyether were evenly mixed, with a dry weight ratio of 73:20:5:1.5:0.5, in an appropriate amount of deionized water to obtain the coating layer slurry whose solid content is 35% by weight. A number-based median particle size of the first-type organic particles was 12 μm, and a median volume-based particle size $D_v50$ of the inorganic particles aluminum oxide ($Al_2O_3$) was 1 μm.

(3) The coating layer slurry prepared in step (2) was applied on two surfaces of the polyethylene (PE) substrate by using a coater, followed by processes such as drying and slitting, to obtain the separator 1. A line count of the gravure roller of the coater was 190LPI, a speed of coating was 70 m/min, a line speed ratio of coating was 1.3, and a coating layer weight on one side of the separator per unit area was 2.0 g/m². In the separator, the first-type organic particles are embedded into the inorganic particle layer and form bulges on a surface of the inorganic particle layer. A thickness of the inorganic particle layer was 2 μm, and a ratio of an average height of the bulges to the thickness of the inorganic particle layer was 5.

Preparation methods of separators 2 to 20 and the separator 1 are similar, with a difference in the number-based median particle size, mass ratio, substance category, or particle morphology that was adjusted. For details, refer to Table 1.

Preparation methods of separators 21 to 34 and the separator 1 are similar, with a difference in the second-type organic particles styrene-vinyl acetate-pyrrolidone copolymer (a number-average molecular weight is 80,000) that was added to the coating layer, and the number-based median particle size, mass ratio, substance category, or particle morphology that was adjusted. For details, refer to Table 2.

Properties of the prepared separators were included in Table 1 and Table 2.

II. Preparation of Battery

1. Preparation of Positive-electrode Plate

A positive-electrode active material $LiNi_{0.5}Co_{0.2}Mn_{0.3}O_2$ (NCM523), a conductive agent carbon black (Super P), and a binder polyvinylidene fluoride (PVDF) were evenly mixed, with a dry weight ratio of 96.2:2.7:1.1, in an appropriate amount of a solvent N-methylpyrrolidone (NMP) to obtain a positive-electrode slurry. The positive-electrode slurry was applied on a positive-electrode current collector aluminum foil, followed by processes such as drying, cold pressing, and slitting, to obtain a positive-electrode plate.

2. Preparation of Negative-electrode Plate

A negative-electrode active material artificial graphite, a conductive agent carbon black (Super P), a binder styrene-butadiene rubber (SBR), and sodium carboxymethyl cellulose (CMC-Na) were evenly mixed, with a dry weight ratio of 96.4:0.7:1.8:1.1, in an appropriate amount of a solvent deionized water to obtain negative-electrode slurry. The negative-electrode slurry was applied on a negative-electrode current collector copper foil, followed by processes such as drying, cold pressing, slitting, and cutting, to obtain a negative-electrode plate.

3. Preparation of Electrolyte

Ethylene carbonate (EC) and ethyl methyl carbonate (EMC) were mixed with a mass ratio of 30:70 to obtain an organic solvent. Fully dried electrolyte salt $LiPF_6$ was dissolved in the mixed solvent, with a concentration of the electrolyte salt being 1.0 mol/L, and was evenly mixed to obtain an electrolyte.

4. Separator

The separator is a separator 1 prepared by using the foregoing method.

5. Preparation of Secondary Battery

The positive-electrode plate, the separator, and the negative-electrode plate were sequentially stacked, so that the separator was arranged between the positive-electrode plate and the negative-electrode plate for separation, and then wound to obtain an electrode assembly. The electrode assembly was placed into an outer package, and the prepared electrolyte was injected into the dried secondary battery, followed by processes such as vacuum packaging, standing, formation, and shaping, to obtain a secondary battery.

The preparation method of the secondary batteries in examples 2 to 32 and comparative examples 1 and 2 is similar to that of the secondary battery in example 1, with a difference in that different separators are used. For details, refer to Table 1 and Table 2.

III. Performance Test Method

1. Cycling Performance at 45° C.

At 45° C., a secondary battery prepared in the examples and comparative examples was charged at a constant current rate of 1C to a charging cut-off voltage 4.2V, charged at a constant voltage to a current ≤0.05C, and left standing for 30 min, and then discharged at a constant current of 0.33C to a discharging cut-off voltage of 2.8V and left standing for 30 min. A battery capacity at that moment was recorded as C0. The battery was charged and discharged for 1500 cycles by using the method. After the 1500 cycles of charging and discharging, the battery capacity was recorded as C1.

A cycling capacity retention rate of the battery at 45° C. was C1/C0×100%.

2. Heat Transfer Performance

At 25° C., a secondary battery prepared in the examples and comparative examples was charged at a constant current of 1C rate to a charging cut-off voltage 4.2V, and then charged at a constant voltage to a current of ≤0.05C, and left standing for 10 min. A metal heating plate was attached to a surface of the battery, a clamp was used at a position, not in contact with the heating plate, on the battery to fix the battery, and a 3 mm heat insulation pad was arranged between the clamp and the battery, and the battery was heated at a constant temperature of 200° C. until thermal runaway occurred. A time of thermal runaway was recorded.

3. Crack SOH (State of Health) Test

At 25° C., a secondary battery prepared in the examples and comparative examples was charged at a constant current of 0.5C rate to a charging cut-off voltage 4.25V, charged at a constant voltage to a current ≤0.05C and left standing for 30 min, and then discharged at a constant current of 0.33C to a discharging cut-off voltage of 2.8V and left standing for 30 min. A battery capacity at that moment was recorded as C0.

The cyclic charge-discharge test was performed on the battery by using the method. Upon each attenuation of 1% based on the battery capacity C0, X-ray CT test (X-ray computed tomography) was performed on the battery. When a crack was found at a corner of the positive-electrode plate or negative-electrode plate of the battery, the battery capacity at that moment was recorded as C1.

Crack SOH=C1/C0×100%

Table 1 and Table 2 provide performance obtained through test of the batteries in the examples and comparative examples. It can be seen from Table 1 that, compared with comparative examples 1 and 2, when the number-based median particle size of the first-type organic particles and the ratio of the average height of the bulges to the thickness of the inorganic particle layer are within the ranges limited by this application, the cycle capacity retention rate, crack SOH and heat transfer time of the battery can be dramatically optimized, thereby improving the cycling performance and safety performance of the battery. In particular, the cycling performance and safety performance of the battery can be further improved by further optimizing the number-based median particle size of the first-type organic particles and the ratio of the average height of the bulges to the thickness of the inorganic particle layer. It can be seen from Table 2 that the cycling performance and safety performance of the battery can be further improved by using the second-type organic particles and optimizing their parameters such as the number-based median particle size.

The inventor has further performed experiments based on other amount and materials, other substrates, other coating process parameters, and other process conditions for the inorganic particles, the first-type organic particles, and the second-type organic particles, and has achieved improvements in battery cycling performance and safety performance similar to examples 1 to 32.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A separator, comprising:
   a substrate; and
   a coating layer provided on at least one surface of the substrate; wherein
   the coating layer comprises organic particles and inorganic particles, the organic particles comprise first-type organic particles and second-type organic particles, the inorganic particles form an inorganic particle layer on the at least one surface of the substrate, and the first-type organic particles are partially embedded into the inorganic particle layer and form bulges on a surface of the inorganic particle layer;
   a mass ratio of the first-type organic particles to the second-type organic particles is greater than 1:1;
   a number-based median particle size of the first-type organic particles is 12 μm-25 μm;
   an average height of the bulges above the surface of the inorganic particle layer is 10 μm-29 μm;
   a thickness of the inorganic particle layer is 0.5 μm-4 μm; and
   a ratio of an average height of the bulges to a thickness of the inorganic particle layer is 4-20.

2. The separator according to claim 1, wherein the first-type organic particles are secondary particles, the secondary particles have an average particle size of 150 nm to 300 nm.

3. The separator according to claim 1, wherein the first-type organic particles comprise one or more of a homopolymer or copolymer of a fluorinated alkenyl monomer unit, a homopolymer or copolymer of an alkylene monomer unit, a homopolymer or copolymer of an unsaturated nitrile monomer unit, a homopolymer or copolymer of an alkylene oxide monomer unit, and modified compounds of the foregoing homopolymers or copolymers; and
   the first-type organic particles comprise one or more of polytetrafluoroethylene, polytrifluorochloroethylene, polyfluoroethylene, polyvinylidene fluoride, polyethylene, polypropylene, polyacrylonitrile, polyethylene oxide, a copolymer of different fluorinated alkenyl monomer units, a copolymer of the fluorinated alkenyl monomer unit and the alkylene monomer unit, a copolymer of the fluorinated alkenyl monomer unit and an acrylic acid monomer unit, a copolymer of the fluorinated alkenyl monomer unit and an acrylic monomer unit, and modified compounds of the foregoing homopolymers or copolymers.

4. The separator according to claim 1, wherein the first-type organic particles comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of the foregoing copolymers.

5. The separator according to claim 1, wherein the separator satisfies at least one of the following (1) and (2):
   (1) a mass ratio of the first-type organic particles to the coating layer is ≥12%; and
   (2) a mass ratio of the inorganic particles to the coating layer is ≤85%.

6. The separator according to claim 1, wherein a median volume-based particle size $D_v50$ of the inorganic particles is 0.5 μm-2.5 μm.

7. The separator according to claim 1, wherein the inorganic particles comprise one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin oxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium dioxide ($CeO_2$), zirconium titanate ($SrTiO_3$), barium titanate ($BaTiO_3$), and magnesium fluoride ($MgF_2$).

8. The separator according to claim 1, wherein the separator satisfies one or more of the following (1) to (5):
   (1) an air permeability of the separator is 100s/100 mL-300s/100 mL;
   (2) a tensile strength in transverse direction (MD) of the separator is 1500 kgf/cm$^2$-3000 kgf/cm$^{2-}$;
   (3) a tensile strength in machine direction (TD) of the separator is 1000 kgf/cm$^2$-2500 kgf/cm$^{2-}$;
   (4) a transverse elongation at break of the separator is 50%-200%; and
   (5) a longitudinal elongation at break of the separator is 50%-200%.

9. The separator according to claim 1, wherein the inorganic particles and the organic particles form an uneven pore structure on the coating layer.

10. The separator according to claim 1, wherein: a distance between any two adjacent inorganic particles is recorded as L1, a distance between any one inorganic particle and any one organic particle that are adjacent is recorded as L2, and then L1<L2.

11. The separator according to claim 1, wherein a mass ratio of the first-type organic particles to the coating layer is 15%-25%.

12. A secondary battery, comprising a separator according to claim 1.

13. A separator, comprising:
a substrate; and
a coating layer provided on at least one surface of the substrate; wherein
the coating layer comprises organic particles and inorganic particles, the organic particles comprise first-type organic particles and second-type organic particles, the inorganic particles form an inorganic particle layer on the at least one surface of the substrate, and the first-type organic particles are partially embedded into the inorganic particle layer and form bulges on a surface of the inorganic particle layer, and the first-type organic particles are secondary particles;
a number-based median particle size of the first-type organic particles is ≥12 μm;
a ratio of an average height of the bulges formed by the first-type organic particles to a thickness of the inorganic particle layer is ≥4;
the second-type organic particles are partially embedded into the inorganic particle layer and form bulges on a surface of the inorganic particle layer, a number-based median particle size of the second-type organic particles is larger than a median volume-based particle size Dv50 of the inorganic particles, and the second-type organic particles are primary particles different from the secondary particles of the first-type organic particles;
a number-based median particle size of the second-type organic particles is 2 μm-10 μm;
a mass ratio of the second-type organic particles to the coating layer is less than 10%, and a mass ratio of the first-type organic particles to the second-type organic particles is greater than 1:1.

14. The separator according to claim 13, wherein: the second-type organic particles comprise one or more of a homopolymer or copolymer of the acrylic monomer unit, a homopolymer or copolymer of the acrylic acid monomer unit, a homopolymer or copolymer of a styrene monomer unit, a polyurethane compound, a rubber compound, and modified compounds of the foregoing homopolymers or copolymers; and the second-type organic particles comprise one or more of a copolymer of an acrylic monomer unit and a styrene monomer unit, a copolymer of an acrylic acid monomer unit and the styrene monomer unit, a copolymer of the acrylic acid monomer unit, the acrylic monomer unit, and the styrene monomer unit, a copolymer of the styrene monomer unit and an unsaturated nitrile monomer unit, a copolymer of the styrene monomer unit, an alkylene monomer unit, and the unsaturated nitrile monomer unit, and modified compounds of the foregoing copolymers.

15. The separator according to claim 13, wherein the second-type organic particles comprise one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the foregoing copolymers.

16. The separator according to claim 13, wherein the number-based median particle size of the second-type organic particles is 2.5 μm-6 μm.

17. The separator according to claim 13, wherein a mass ratio of the first-type organic particles to the coating layer is 15%-25%.

* * * * *